Figure 6:
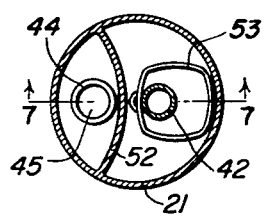

Dec. 12, 1961     E. O. THOMPSON     3,012,322
DENTAL AND SURGICAL EVACUATIVE SUCTION APPARATUS
Original Filed Feb. 19, 1954     3 Sheets-Sheet 1
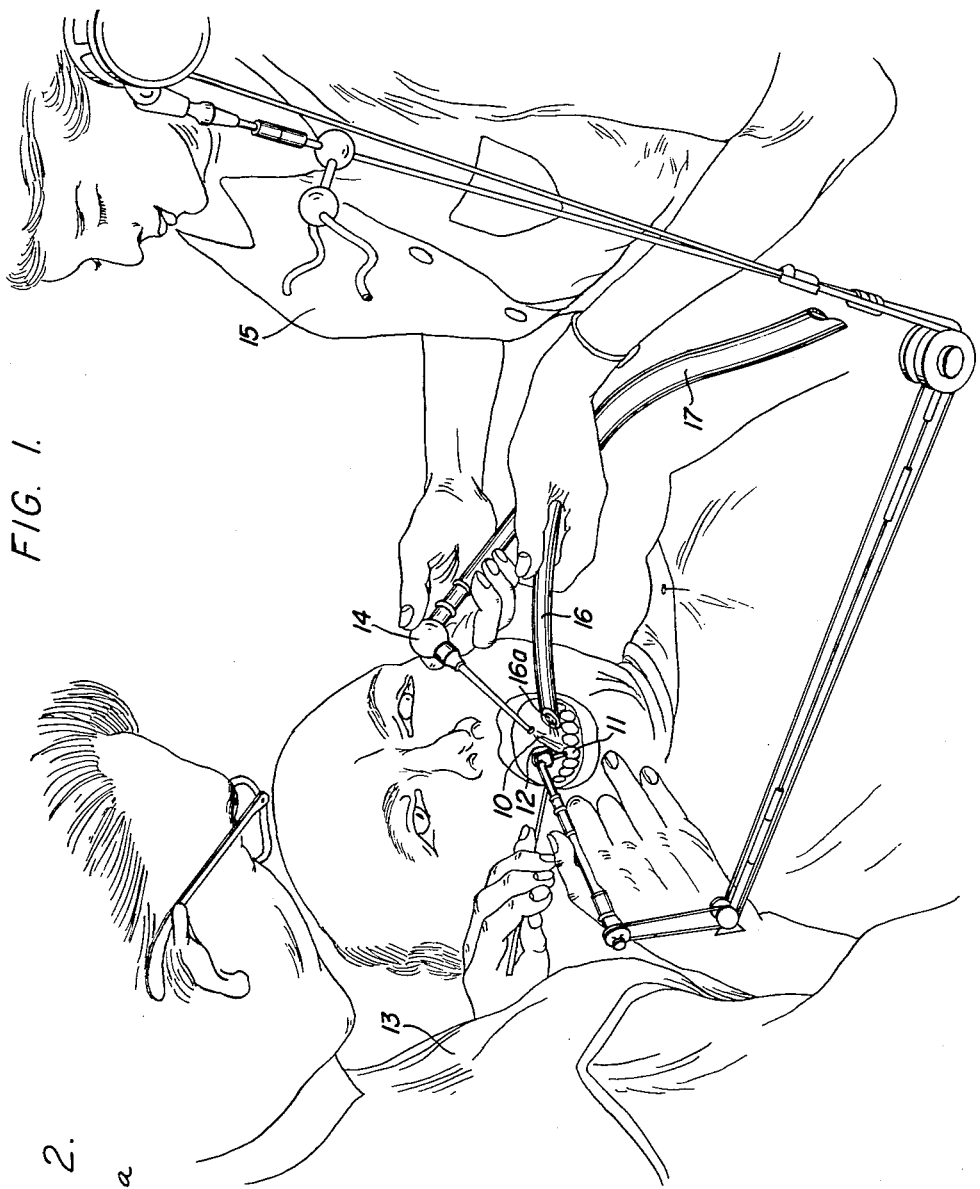
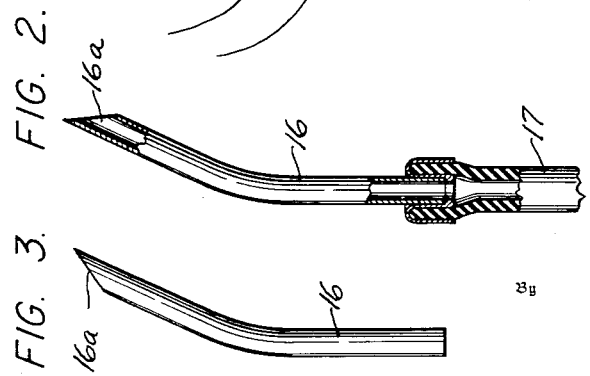
Inventor
ELBERT O. THOMPSON
By
Attorneys Dec. 12, 1961      E. O. THOMPSON      3,012,322
DENTAL AND SURGICAL EVACUATIVE SUCTION APPARATUS
Original Filed Feb. 19, 1954      3 Sheets-Sheet 2
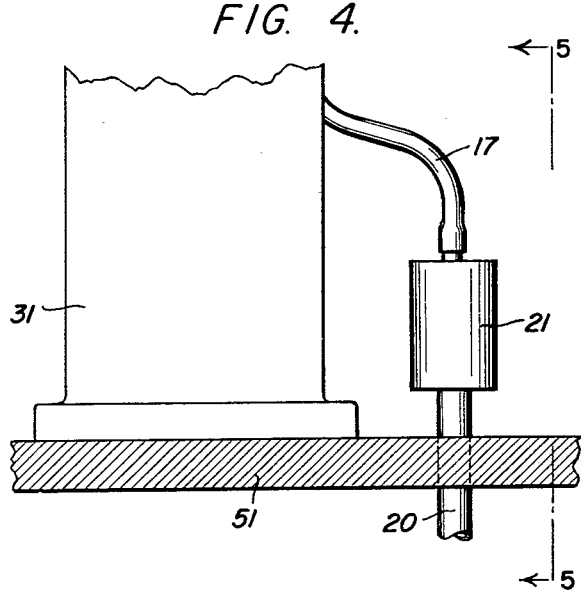
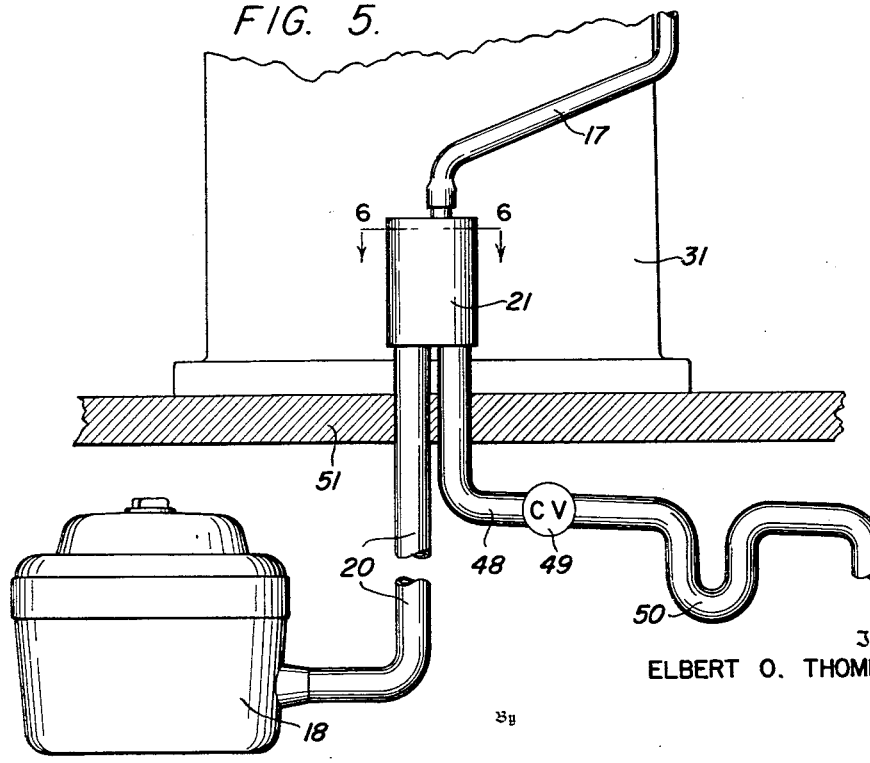
Inventor
ELBERT O. THOMPSON
By
Attorneys Dec. 12, 1961 E. O. THOMPSON 3,012,322
DENTAL AND SURGICAL EVACUATIVE SUCTION APPARATUS
Original Filed Feb. 19, 1954 3 Sheets-Sheet 3

Inventor
ELBERT O. THOMPSON

By

Attorneys

United States Patent Office 3,012,322
Patented Dec. 12, 1961

3,012,322
DENTAL AND SURGICAL EVACUATIVE SUCTION APPARATUS
Elbert O. Thompson, Salt Lake City, Utah, assignor to Vacudent Manufacturing Company, Salt Lake City, Utah
Original application Feb. 19, 1954, Ser. No. 411,510. Divided and this application July 28, 1961, Ser. No. 127,628
3 Claims. (Cl. 32—33)

This invention relates to dental and surgical evacuative suction apparatus for use primarily in connection with the novel method of "Washed Field" dentistry disclosed and claimed in my copending application for U.S. patent Serial Number 411,510, filed February 19, 1954, and entitled "Method of Dentistry and Apparatus Therefor," now Patent No. 3,012,323, issued December 12, 1961, of which this present application is a division.

The carrying out of my method necessarily involves evacuative apparatus of the general character here described, though particular features of the apparatus are subject to considerable variation. For example, the apparatus here shown is arranged as a fixed and permanent installation in a dental office. It can, however, and often will be made portable in accordance with the teachings of my copending application for U.S. patent Serial No. 471,734, filed November 29, 1954, entitled "Evacuative Suction Apparatus," now Patent No. 2,784,717, granted March 12, 1957, or it may be made in the form disclosed in my copending application for patent Serial No. 736,654, filed April 30, 1958, entitled "Evacuative Suction Apparatus," which is a continuation of my earlier and now abandoned, similarly entitled application Serial No. 522,590, filed July 18, 1955.

The apparatus which I have developed for the purpose of carrying out my operative method to best advantage embodies a suction cleaner unit, which, by its very nature, has considerably greater volumetric capacity per unit time than is utilized either for a saliva ejector or for the customary surgical aspirator, together with evacuative tube and nozzle having flow passage and intake orifice considerably greater in cross-section than could be effectively handled by such saliva ejector or surgical aspirator equipment.

An entrapment device for the elimination of liquids and solids entrained in the stream of air withdrawn from the mouth of the patient is also combined with such suction cleaner unit and evacuative tube and nozzle or mouthpiece to produce uniquely effective dental apparatus. In accordance with the present invention, a removable and water-resistant filter receptacle is disposed within the entrapment device for catching and retaining solid matter carried by the incoming stream of air. In this way, it is possible to not only effect the purposes of the method, but to also salvage any gold or other values which may be withdrawn from the mouth during the operating procedure.

A suction cleaner unit or, as it may be more appropriately termed "motor-fan air evacuation unit," which I have found to be ideal for my purposes is that utilized for the currently popular filter-receptacle type of vacuum cleaner e.g. the "Filter Queen," manufactured by Health-Mor, Inc., Chicago, Illinois, the "Lewyt," and others employing an especially powerful, suction-producing, motor-fan unit for displacing air. This is in contradistinction to the vacuum pumps of comparatively positive displacement character embodied in standard surgical aspirating equipment presently in common use by both physicians and dentists.

Further objects and feature of the invention will become apparent from the following detailed description of the application of the method and of a particular preferred form of apparatus illustrated in the accompanying drawings.

Figure 7:
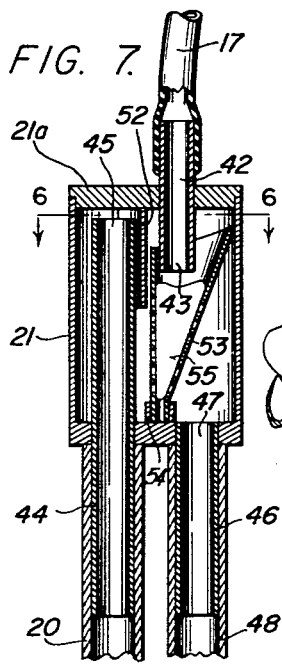
Figure 8:
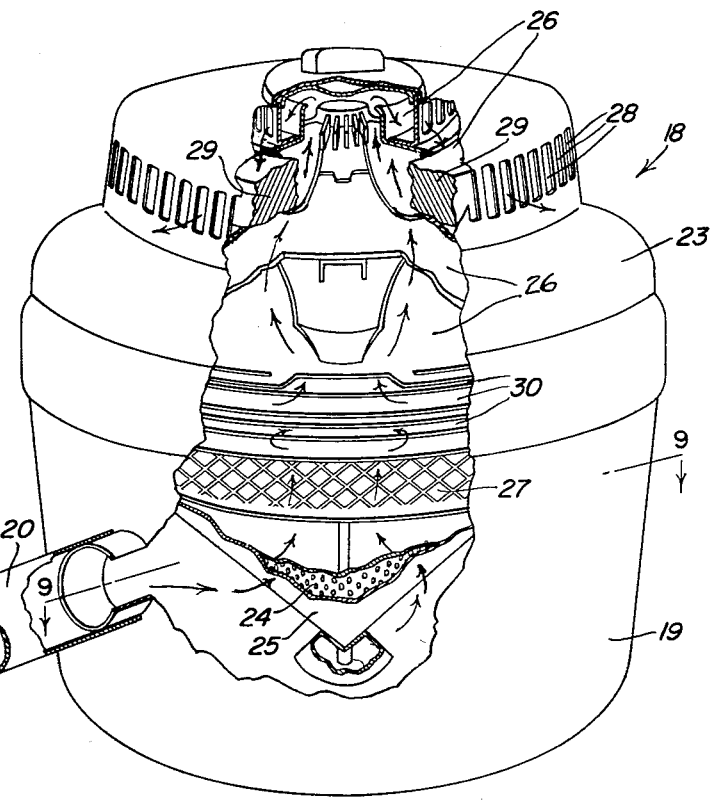

In the drawings:
FIG. 1 represents a perspective view of dental work in progress within the mouth of a patient, and application of the method of the invention to and during such dental work;
FIG. 2, a fragmentary elevational view, partly in longitudinal section, showing, in detail, a suction intake nozzle as attached to the evacuative hose of FIG. 1;
FIG. 3, a view in elevation showing a similar nozzle, per se, having a somewhat different form of intake opening;
FIG. 4, a fragmentary view in elevation showing an installation in a dental office of apparatus conforming to the invention, the view being in vertical section with respect to the floor of the office;
FIG. 5, a view similar to that of FIG. 4, but taken on the line 5—5 thereof, and illustrating components of the apparatus connected to the plumbing of the building;
FIG. 6, horizontal section taken on the line 6—6 of FIG. 5, and drawn to a somewhat enlarged scale, this view showing the catch receptacle in detail;
FIG. 7, a vertical section taken on the line 7—7 of FIG. 6, and drawn to the same enlarged scale;
FIG. 8, a perspective view of a preferred form of suction cleaner unit component to the apparatus, as illustrated in FIG. 5, portions being broken away to reveal internal parts in elevation and partially in vertical section; and
FIG. 9, a horizontal section taken on the line 9—9 of FIG. 8.

Referring now to the drawings:
The procedure depicted in FIG. 1 is typical of the manner in which my method is carried out in practice. There, the dental work in progress is the conventional drilling for the removal of decayed portions of a tooth in the preparation of a clean cavity for filling.

As illustrated, a jet of water 10 is projected against the tooth 11 being worked upon and against the usual drill 12 doing the work and held by the dentist 13. Such jet 10 may be provided from any suitable source, preferably a customary dental unit water syringe, indicated 14, and directed onto the work by an attendant 15. A suitable hose and nozzle arrangement may, however, be attached directly to the drill, for manipulation by the dentist coincidental with his manipulation of the drill, if desired in any instance.

In the procedure illustrated, the attendant also manipulates an intake nozzle or mouthpiece 16 connected to an evacuation hose 17 of the dental evacuation apparatus of this invention. The attendant places such intake nozzle relative to the work in progress such that the air stream passing thereinto entrains and carries with it the wash liquid, which, in turn, has entrained therein the debris resulting from the work in progress. It should be noted that the intake nozzle 16 is held somewhat away from the drill and the wash water, so as to suck in a stream of air, and that the air stream actually entrains the wash water and debris as it passes over the tooth being worked upon, thereby forcibly carrying such wash water and debris into the nozzle and through hose 17. It is not necessary nor desirable to submerge the intake orifice 16a of the nozzle in liquid to be evacuated, as is required by conventional saliva ejectors and surgical aspirators.

Figure 9:
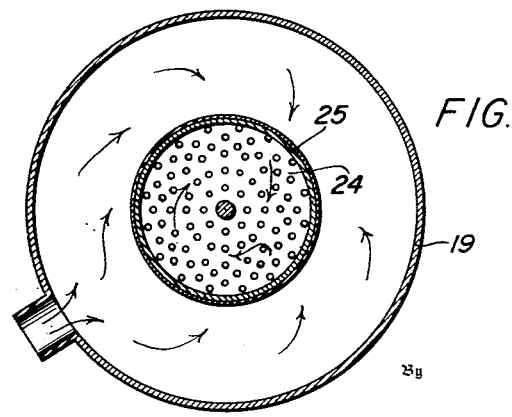

The stream of air utilized for entraining the wash water and debris is established and maintained by a motor-fan air evacuation unit, preferably of the filter-receptacle, vacuum cleaner type indicated 18 in FIG. 5, the internal arrangement of one advantageous form of which is illustrated in FIGS. 8 and 9. Suitable vacuum cleaner units are available on the open market from a variety of manufacturers. For the purposes of this invention, they must embody an especially powerful motor-fan unit, as will appear more fully hereinafter.

Regardless of the particular type of motor-fan air evacuation unit utilized, it is necessary for the purposes of the invention that sufficient evacuative capacity, on both a volumetric and a velocity basis, be maintained with respect to the size of the nozzle intake orifice and evacuative passage to provide a continuously flowing stream of air within the mouth of the patient and across the area being worked upon to adequately entrain the washings and saliva incidental to the practice of the method. It is important that the volumetric flow of air be many times that of the wash liquid discharged from water syringe 14.

While the evacuative passage through the intake nozzle preferably is, or approximates, one-half inch in right cross-sectional diameter, with the passage through the evacuation hose and the size of the nozzle intake orifice being the same or somewhat larger, this is not a critical value in the sense that deviations cannot be made either way. Generally speaking, it is not desirable to appreciably reduce the size of this passage, since the carrying capacity of the stream depends largely upon the volume of air flow involved per unit time. It is normally unwise to utilize a diameter less than one-quarter of an inch. On the other hand, when the diameter of the intake nozzle passage is larger than five-eighths of an inch, manipulation of the nozzle within the mouth becomes something of a problem. The selection of an appropriate size in any given instance will, thus, depend upon what is practical under the circumstances, given adequate carrying capacity of the air stream.

It should be noted that the size of the evacuative passage through the nozzle ordinarily determines the effective size of the nozzle inflow orifice. Nevertheless, it should be realized that this need not be, so long as the sizes are all selected in a well known manner to insure a flow of air, from the mouth of the patient to the disposal unit, which has sufficient volume and velocity to effectively entrain and carry the washings and other matter desired to be removed from the mouth. These can be easily determined by calculation or by actual test for any special instance of use. The relative sizes indicated herein and by the accompanying drawings will give excellent results in most ordinary instances of use.

The evacuative capacity of the source of suction applied to the evacuative passeage is, of course, very important from the standpoint of the functional characteristics desired, though, structurally, such source of suction may vary considerably from one useful embodiment of the apparatus of this invention to another. Thus, the source of suction must be capable of inducing and disposing of the flow of a considerable volume of air in a continuous fashion and at a velocity adequate to accomplish the liquids and solids entraining function required by the method of this invention. In this connection, it should be realized that a motor-fan air evacuation unit has, inherently, a low vacuum-producing capacity in comparison to a vacuum pump as used in conventional aspirating equipment. A static suction of more than five inches of mercury at the intake orifice of the nozzle employed with my apparatus is ordinarily wholly unnecessary and undesirable, the preferred figure being approximately two inches. Except insofar as the suction source has the above characteristics, together with the ability to handle air of very high humidity, the nature and structure of same forms no part of the present invention.

As aforestated, there are commercially available suction cleaner units which satisfy all the requisites of this invention. The one illustrated, and indicated 18, has been found to be particularly advantageous in its handling of the very humid air which ultimately passes through it, following the elimination therefrom of most of the liquid and solid content. As illustrated in detail in FIGS. 8 and 9, such vacuum cleaner unit 18 comprises a receptacle 19, into which a hose or other suitable type of conduit 20, FIGS. 4 and 5, leading from a catch receptacle 21, discharges. The motor-fan unit 23 is a self-contained assembly, which fits into and clamps over the open top of receptacle 19, and which is provided with a foraminous cone intake 24 adapted to dip deeply into the receptacle and to receive, in snugly fitting relationship to and over its outer face, a removable filter cone 25, preferably of disposable paper, fabric, or the like.

Any moisture or fine solids which may escape elimination from the air stream as it passes through the intermediate catch receptacle 21 will be deposited in suction cleaner receptacle 19 or caught by filter cone 25. Further protection against injury to the motor as the air stream passes thereover by way of exit passages 26 is provided by a secondary filter 27, and a final filtering prior to release of the air through exit openings 28 is advantageously accomplished by an additional filter 29 at the top of the unit.

As mentioned hereinbefore, the detailed construction described above has been found to be very satisfactory for use as a component part of the apparatus of the invention, but represents a standard receptacle-filter type of modern suction or vacuum cleaner available on the market, and not, in its details, forming any part of the present invention.

The manufacturer's specifications for the above suction cleaner unit lists a static suction at the standard hose inlet (one and five-eighths inches in diameter) of from 52 inches to 58 inches of water at a motor speed of approximately 19,000 r.p.m., the input rating of the electric motor being three-quarters horsepower. The air movement so produced, according to the Bureau of Standards' method of testing, is 40 cubic feet per minute.

The two fans 30 utilized by this unit are mounted in tandem on the armature shaft (not shown) of the motor, and are of centrifugal impeller type, approximately 5 inches in diameter.

Employing this particular construction of suction cleaner unit with an evacuative hose one-half inch inside diameter and an intake nozzle also one-half inch inside diameter and having a slanted intake orifice as illustrated, I have found the intake volume to be approximately 8 cubic feet per minute, as measured by a Fisher & Porter flow rater tube No. B5–27–6, and the static suction to be approximately two inches of mercury. Flow of water through the standard water syringe 14, it should be noted, is normally not over 150 cc. (0.005 cu. feet) per minute.

It should be realized that these detailed figures are given merely for the purpose of clearly identifying what I have found to be completely satisfactory in my practice of the invention. The permitted approximation affords some leeway in both directions.

In the illustrated instance, the catch receptacle 21 is connected with the drain plumbing of the building in which the dental office is located, thereby providing for continuous disposal of the liquid washings evacuated from the mouths of patients.

In many instances, it is desirable to construct the apparatus in portable form, which involves the use of a catch receptacle having sufficient capacity in and of itself to retain the evacuated liquid washings as they accumulate between periodic emptyings of the receptacle. Preferred apparatus of this type forms the subject matter of my aforementioned copending application for patent Serial No. 471,734.

The apparatus may also be constructed and arranged with the catch receptacle supported by the regular dental unit, in position affording gravity drainage directly to the dental cuspidor. Such an arrangement forms the subject matter of my aforementioned copending application for patent Serial No. 736,654.

As here illustrated, the catch receptacle 21 is positioned adjacent the base pedestal 31 of a customary dental work unit, which, together with the dental chair, is standard equipment in practically all dental offices. It is preferably of plastic, having an inset cover 21a, through which extends a length of pipe 42, providing convenient connection for evacuation hose 17, externally of the receptacle, and an inflow port within the upper interior of the receptacle for the stream of evacuated air and entrained washings. As such, pipe 42 provides discharge means for the fluid-conducting tube or evacuation hose 17.

Through the closed bottom of the receptacle 21 extends a length of pipe 44, terminating adjacent the underside of the cover 21a and providing thereat an air exhaust port 45. Conduit 20 leading to suction cleaner unit 18 conveniently connects to the externally protruding lower end of pipe 44, thereby establishing a through flow evacuation system from nozzle orifice 16a to suction cleaner exhaust ports 28, catch receptacle 21 being interposed as a trap for liquids and solids entrained in the evacuated air stream.

In this fixed installation, the catch receptacle need not have storage capacity for accumulations of liquid, for it is provided with its own drain. Thus, as illustrated, a pipe 46 passes through the closed bottom of receptacle 21, terminating preferably flush with its inner surface, to provide a drainage port 47. Connected to such pipe 46 is drain piping 48, having interposed along its length a check valve 49 and a trap 50, and ultimately connecting with the main waste piping of the building, leading to the sewer. In the particular installation illustrated, both the plumbing and the suction cleaner unit are positioned below the office floor 51.

A partition 52, depending deeply across the upper part of the catch receptacle 21, separates the inflow port 43 from the exhaust port 45 and functions as a baffle to enforce dropping of the entrained liquids and solids by the air stream prior to its flow into the conduit 20.

For the purpose of salvaging gold and other values from the solid matter entrained in the evacuated washings, I direct the stream of air entering catch receptacle 21 into a filter arrangement which is removable and replaceable. In the embodiment illustrated, such filter arrangement is provided by a foraminous, funnel-like receptacle 53, removable and replaceable with respect to a receiving and holding formation 54 rising from the bottom of the catch receptacle 21. A conical filter paper 55, or other filter medium, is inserted within the filter receptacle 53 to directly catch and retain solid matter entering the catch receptacle with the inflowing air. The liquid constituents pass through the filter and discharge through waste piping 48, while the thus cleansed air finds its way to exhaust port 45.

It will thus be seen that, in the practice of my method using the apparatus illustrated, a stream of air and entrained washings will be continuously evacuated from the mouth of the patient undergoing dental work, and will flow along the evacuation hose 17, through the liquids and solids entrapment device represented by catch receptacle 21 and its internal filter arrangement, and into and through suction cleaner unit 18, from which the completely cleansed air will return to the atmosphere by way of exhaust ports 28.

In the application of my method to the routine dental work for which it is particularly adapted, I have found that there is a saving of approximately one-third of the time normally taken for such work as carried out in conventional manner. This saving in time for both the dentist and the patient is accomplished coincidentally with considerably less pain for the patient and better working conditions for the dentist. Because the field of operation is continuously washed free of debris, more precise work is possible than heretofore, with less danger of damaging sensitive portions of any tooth being worked upon. Furthermore, rapid and effective evacuation of all foreign matter from the mouth is obtained in all types of dental work, without likelihood of injuring mouth tissues.

While I have developed my method and apparatus primarily from the standpoint of their application to dentistry, I have found that they may be also advantageously applied in general surgery. Thus, from the foregoing, it can be seen that my method is concerned essentially with what might be appropriately termed a "washed field" procedure, and the apparatus with means for accomplishing this procedure.

Heretofore, surgical aspirators have been used for removing accumulating blood and body fluids in various kinds of surgical operations, oral and otherwise, such aspirators being capable, however, only of removing pools of accumulated liquid, and having the functional disadvantages heretofore discussed.

In the application of my method and apparatus to general surgery, a wash stream of sterile water or other wash solution is directed onto the operative field in much the same manner as described above with respect to dental work on the teeth, thereby washing the operative field free of debris. The washings and accumulating blood and other body fluids are continuously withdrawn by entrainment in a stream of air in the manner heretofore described, it being noted that this procedure has been proven safe and highly effective in connection with major surgery internally of the human body. I have found that the suction employed in my method is gentle and non-traumatizing when applied to or near the most delicate tissues.

Whereas this invention is here illustrated and described with respect to preferred specific forms thereof, it should be understood that considerable variation is possible within the generic teachings hereof and the scope of the claims which here follow.

I claim:

1. In evacuation apparatus for dental and surgical work utilizing a stream of fluid projected on an area being worked upon, said apparatus including a fluid-conducting tube, at least the outer reach of which is flexible and of length adapted for manipulation relative to a patient and is provided at the outer, intake end thereof with inflow orifice means, air-suction means operatively connected with said tube, and a liquids and solids entrapment device interposed between said tube and said air-suction means, in fluid-flow communication therewith, the improvement, comprising a removable and water-resistant filter receptacle disposed within the entrapment device for catching and retaining solid matter carried by the incoming stream of air.

2. The improvement of claim 1, wherein the entrapment device is a catch receptacle; the fluid-conducting tube has discharge means extending into said catch receptacle adjacent the top thereof; a pipe extends upwardly within said catch receptacle, from flow connection with the air-suction means to an open termination adjacent the top of the catch receptacle above said discharge means, thereby providing an air exhaust port for said catch receptacle; and the removable filter receptacle is disposed to comprehend the discharge from said discharge means.

3. In evacuation apparatus for dental and surgical work utilizing a stream of fluid projected on an area being worked upon, said apparatus including a fluid-conducting tube, at least the outer reach of which is flexible and of length adapted for manipulation relative to a patient and is provided at the outer, intake end thereof with inflow orifice means, air-suction means operatively connected with said tube, and a liquids and solids entrapment device interposed between said tube and said air-suction means, in fluid-flow communication therewith, the improvement, comprising a fluid-conducting tube and inflow orifice means as specified which has inflow and conducting capacities, respectively of at least approximately eight cubic feet of air and entrained matter per minute; air-suction means as specified which has an exhaust to atmosphere and is capable in normal operation of evacuating from the patient said approximately eight cubic feet of air and entrained matter per minute through said tube and orifice means and which does not develop a static suction of more than approximately five inches of mercury at the said inflow orifice means; and, internally of said liquids and solids entrapment device, a removable water-resistant, filter receptacle for solid matter removed from the stream of air.

References Cited in the file of this patent
UNITED STATES PATENTS 2,627,937     Martinet _____ Feb. 10, 1953

FOREIGN PATENTS 258,134     Switzerland _____ Apr. 16, 1949